May 30, 1967        D. B. FURLOW        3,322,917
FLOAT SWITCH
Filed Jan. 25, 1966
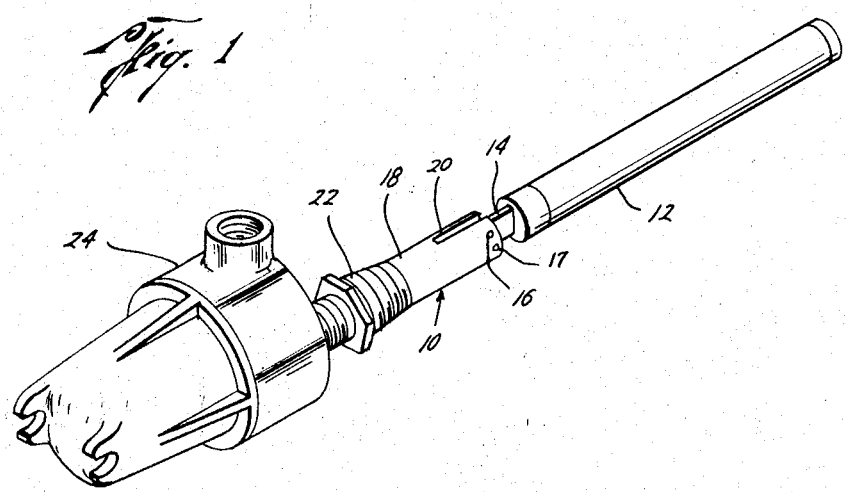
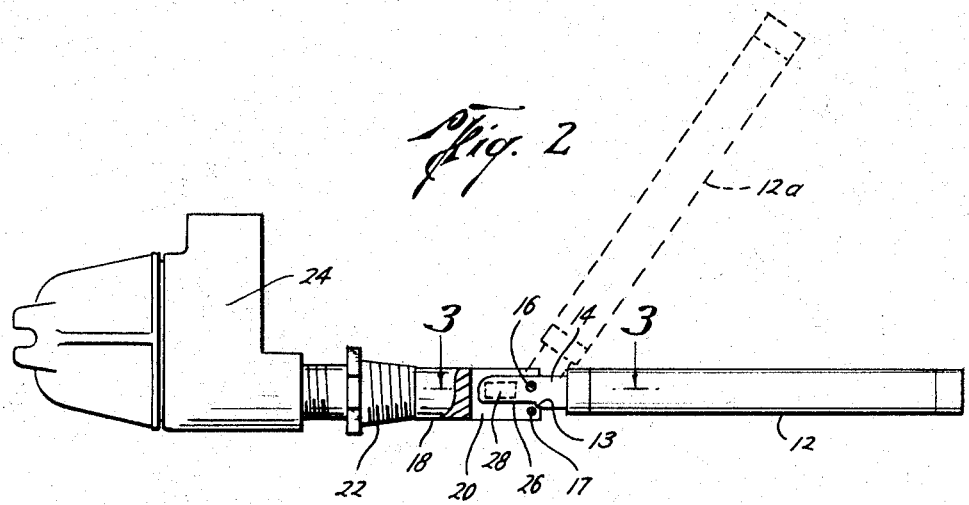
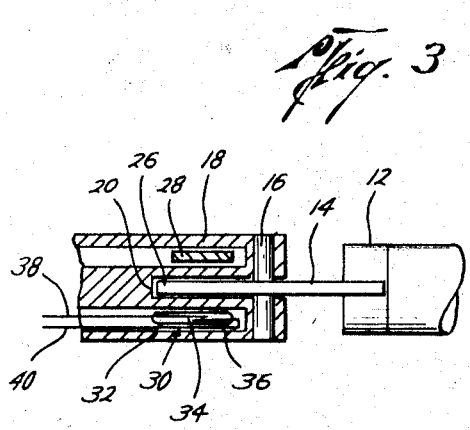
Dale B. Furlow
    INVENTOR.
BY James F. Weiler
Jefferson D. Giller
William A. Stout
Paul L. DeVerter II
Dudley R. Dobie, Jr.
    ATTORNEYS

3,322,917
FLOAT SWITCH

Dale B. Furlow, Tulsa, Okla., assignor to Black, Sivalls & Bryson, Inc., Kansas City, Mo., a corporation of Delaware
Filed Jan. 25, 1966, Ser. No. 522,942
3 Claims. (Cl. 200—84)

The present invention generally relates to an improved magnetic float switch operable in response to variation in level of a liquid in a vessel to control the level and more particularly to a magnetic float switch having a pivoting float arm and magnetic shield attached thereto capable of blocking the lines of magnetic force between a permanent magnet and a reed switch whereby an electrical circuit may be opened and closed.

It would be highly advantageous to provide a float control switch for use in explosive atmospheres and under high pressure with a minimum of moving parts yet providing reliable actuation means even under the most severe operating conditions. The present invention is directed to such a float switch assembly.

It is, therefore, an object of the present invention to provide a float switch of rugged and compact construction suitable for operation in an explosive atmosphere and under high pressure.

Another object of the present invention is to provide a float switch wherein there are few mechanically moving parts and wherein such moving parts need not be protected from the liquid being controlled.

A further object of the present invention is to provide a float switch may be immersed in the liquid being controlled without danger of wearing moving parts.

Yet another object of the present invention is to provide a float switch for detecting and controlling the level of a liquid within a vessel wherein the switch apparatus is compact and may be installed through a narrow aperture in the wall of the vessel.

Still another object of the present invention is to provide an improved float switch device for detecting and controlling the level of a liquid within a vessel wherein the float switch device comprises float and float arm pivotally attached at one end within the recess of a support, a permanent magnet secured on one side of the support adjacent the recess, reed switch means secured on the one side of the support opposite the permanent magnet and a magnetic shield integrated with the float arm at its pivoted end to shield the reed switch from lines of force of the permanent magnet whereby the reed switch may be opened and closed according to position of the float arm and shield.

Other and further objects, features and advantages will be apparent from the following description of a presently preferred embodiment of the invention, given for the purpose of disclosure and taken in conjunction with the accompanying drawings, where like character references designate like parts throughout the several views, and where FIGURE 1 is a perspective view of the float switch device of the present invention, FIGURE 2 is a partial cross-sectional side view of the device of the present invention, and FIGURE 3 is a partial cross-sectional top view taken along the line 3—3 of FIGURE 2 showing the permanent magnet, reed switch, pivoted float and shield in the improved switch of the present invention.

Referring now to FIGURE 1, the reference numeral 10 generally designates the improved float switch device of the present invention which comprises a float 12 with an arm 14 securely connected thereto and pivotally connected by a lug 16 to a support 18. The support 18 has an axial recess 20 to accommodate the float arm 14 and shield means as will be explained fully hereafter. The support 18 is provided with a threaded shank portion 22 for engagement with a matching threaded aperture of a vessel in which a liquid level is to be regulated. Adjacent the threaded shank 22 of the support is an explosion-proof housing 24 for a conventional relay apparatus which does not form a part of the present invention.

With reference now to FIGURE 2, the float switch device of the present invention is illustrated with part of the support member 18 cut away to its recess 20. The float arm 14 is connected to the lug 16 for pivotal movement in a vertical plane and has a shield portion 26 integrally formed therewith. The float 12 and arm 14 are normally held in substantially a horizontal position by means of the butt portion 13 of the arm 14 resting against the lug 17. Shown in dotted outline is a permanent magnet 28 mounted within the support member 18 adjacent the recess 20 and adjacent the shield 26 when the float 12 and arm 14 are in a substantially horizontal position as shown.

Referring now to FIGURE 3, the permanent magnet 28 and shield 26 are shown in spaced relation with a reed switch generally designated by the reference numeral 30. The reed switch 30 is mounted within the support member 18 on the side of the support opposite the permanent magnet 28 and adjacent the recess 20 in a substantially horizontal plane with said permanent magnet 28.

The reed switch 30 comprises a sealed tube 32 of non-magnetic and preferably electrical insulation material such as glass. Suitably carried in the opposite ends of the tube 32 are contact blades 34 and 36 of which at least the latter is made of non-permanent magnetic material so as to be in magnetic relation with the permanent magnet 28 when the float 12 and arm 14 are in other than a substantially horizontal position as will be explained hereafter. The contact blade 36 is normally resiliently urged into a position in which it is spaced from its companion blade 34, and is drawn into conductive engagement with the contact blade 34 when in magnetic relation with the permanent magnet 28. The far ends of the contact blades 34 and 36 which project from the adjacent ends of the tube are connected to leads 38 and 40 respectively. The leads are connected to a suitable relay system not shown, to control a magnetic motor starter or other such equipment for adjusting the liquid level.

Referring again to FIGURE 2, when the liquid level to be regulated rises substantially above the support member 18, the float 12 will assume a position indicated, for example, by dotted outline and reference numeral 12a. In such a position, the shield 26 will no longer be in substantially the same horizontal plane as the permanent magnet 28 and reed switch 30 so that magnetic lines of force of the permanent magnet 28 will actuate the reed switch 30. The shield 26 may be constructed of any suitable magnetic shielding material so that when the float 12 resumes its substantially horizontal position as shown in FIGURE 2, the lines of force of the permanent manget 28 will not strike the reed switch 30.

It will be recognized that the support member 18, lugs 16, and 17, and float arm 14 may be constructed of any suitable material depending upon the service in which the float switch device is to be used. The float 12 may be constructed of any suitable buoyant material depending upon the pressures and corrosiveness of the atmosphere in which the float will be used.

In operation, the float switch 10 is installed and secured to a vessel by means of the threaded shank portion 22 of the support member 18. The float 12 and shield 26 are normally held in a substantially horizontal position by means of the butt portion 13 of the float arm 14 resting against the lug 17 secured to the support to restrict downward movement of the float. When the liquid level within the vessel is great enough to cause the float 12 to assume a position such as that shown by the reference numeral 12a, the shield 26 will no longer be in horizontal spaced relation with the permanent magnet 28 and reed switch 30 so that the magnetic lines of force of the magnet 28 actuate the reed switch 30. Thus the contact blade 36 of the reed switch conductively engages the contact blade 34 to close the electrical circuit within the switch whereby a suitable relay may, for example, actuate an electrically operated pump to pump liquid from within the vessel.

When the liquid level falls enough so that the float 12 resumes substantially a horizontal position, the shield 26 will once again shield the magnetic lines of force of the permanent magnet 28 from the reed switch 30 so that the switch is opened and the pump taking liquid from the vessel is shut off.

It will be recognized by those skilled in the art that the improved magnetic float switch of the present invention is particularly useful in a variety of situations with only slight modification of the float arm pivoting action. The embodiment of the pivoting arm described and shown herein is by way of example only and has many other practical applications.

The present invention, therefore, is well adapted to carry out the objects and attain the ends and advantages mentioned as well as others inherent therein. While a presently preferred embodiment of this invention is given for the purpose of disclosure, numerous changes in details of construction and the combination, shape, size and arrangement of parts may be resorted to without departing from the spirit and scope of the appended claims.

What is claimed is:

1. An improved float switch for control of liquid level within a vessel including,
    an enclosed support member adapted to be secured to the vessel and having an axial recess at one end, the enclosure of the support member extending along both sides of the axial recess,
    a float having an arm member at one end pivotally secured within the axial recess of the support member for movement in a vertical plane,
    a permanent magnet secured within the enclosed support member adjacent to and on one side of the axial recess,
    reed switch means secured within the enclosed support member adjacent to the axial recess on the side of the support member opposite the permanent magnet for actuation by the permanent magnet to control the liquid level,
    shield means integrally formed of the float arm for vertical movement through the axial recess of the support member, the reed switch means being shielded from lines of force of the permanent magnet when the float arm and shield means are in a substantially horizontal position, and
    lug means secured to the support member for preventing movement of the float downward beyond a substantially horizontal position.

2. The invention of claim 1 wherein the reed switch means includes,
    companion contact members wherein one member is formed of non-permanent magnetic material for magnetic relation with the permanent magnet and conductive relation with the other contact member when not shielded from the permanent magnet by the shield means.

3. The invention of claim 1 wherein the shield means is formed of magnetic shield material.

References Cited

UNITED STATES PATENTS

| | | | |
|---|---|---|---|
| 3,145,277 | 8/1964 | Senn | 200—84 |
| 3,210,498 | 10/1965 | Jackson et al. | 335—206 |

BERNARD A. GILHEANY, *Primary Examiner.*

H. E. SPRINGBORN, *Assistant Examiner.*